(12) United States Patent
Meuninck

(10) Patent No.: US 8,582,578 B2
(45) Date of Patent: *Nov. 12, 2013

(54) METHOD AND APPARATUS FOR TRANSPORTING MEDIA CONTENT IN A VIRTUAL PRIVATE NETWORK HAVING CONFIGURABLE NETWORK DEVICES

(75) Inventor: Troy Meuninck, Newman, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/428,628

(22) Filed: Mar. 23, 2012

(65) Prior Publication Data

US 2012/0240178 A1 Sep. 20, 2012

Related U.S. Application Data

(63) Continuation of application No. 12/436,075, filed on May 5, 2009, now Pat. No. 8,160,073.

(51) Int. Cl.
| | | |
|---|---|---|
| H04L 12/28 | (2006.01) | |
| H04L 12/56 | (2011.01) | |
| H04Q 11/04 | (2006.01) | |
| H04L 12/54 | (2013.01) | |

(52) U.S. Cl.
CPC ........ H04Q 11/0478 (2013.01); H04L 12/5695 (2013.01)
USPC ............... 370/395.2; 370/351; 370/395.21; 370/401; 709/217; 709/218; 709/227; 709/228; 709/229; 709/231; 709/238; 725/62; 725/63; 725/73; 725/74; 725/78; 725/81; 725/82; 725/86; 725/105; 725/106; 725/109; 725/110; 725/114; 725/116; 725/118; 725/119; 725/127; 725/131; 725/135; 725/139; 725/143; 725/148; 725/149; 725/151

(58) Field of Classification Search
None
See application file for complete search history.

(56) References Cited

U.S. PATENT DOCUMENTS

| | | | |
|---|---|---|---|
| 5,867,494 A | 2/1999 | Krishnaswamy | |
| 6,446,125 B1 | 9/2002 | Huang | |
| 6,717,944 B1 * | 4/2004 | Bryden et al. | ................. 370/392 |
| 8,060,624 B1 * | 11/2011 | McKinney et al. | ........... 709/228 |
| 2002/0150041 A1 | 10/2002 | Reinshmidt | |
| 2004/0117406 A1 * | 6/2004 | Karaoguz et al. | .......... 707/104.1 |
| 2004/0117845 A1 * | 6/2004 | Karaoguz et al. | ............. 725/134 |

(Continued)

OTHER PUBLICATIONS

Wikipedia, "Microsoft NetMeeting", pp. 1-3, http://en.wikipedia.org/wiki/Netmeeting; website last visited May 5, 2009.

(Continued)

*Primary Examiner* — Ayaz Sheikh
*Assistant Examiner* — Peter Chau
(74) *Attorney, Agent, or Firm* — Guntin & Gust, PLC; Ralph Trementozzi

(57) ABSTRACT

A system that incorporates teachings of the present disclosure may include, for example, a local resource manager server that receives a request to distribute media content, and provides signaling information to a global resource manager server. The global resource manager server can determine a media configuration of a network element based on the signaling information and a media capability of a recipient media processor. The signaling information can be provided to the local resource manager server to enable an initiating media processor to present the media content at the recipient media processor over a virtual private network.

19 Claims, 6 Drawing Sheets

(56) References Cited

U.S. PATENT DOCUMENTS

| | | |
|---|---|---|
| 2005/0190908 A1 | 9/2005 | Haug |
| 2005/0226170 A1* | 10/2005 | Relan et al. ............ 370/254 |
| 2005/0235289 A1 | 10/2005 | Barillari |
| 2005/0246757 A1* | 11/2005 | Relan et al. ............ 725/135 |
| 2006/0020960 A1* | 1/2006 | Relan et al. ............ 725/30 |
| 2006/0187855 A1* | 8/2006 | Booth et al. ............ 370/254 |
| 2007/0083908 A1 | 4/2007 | McCarthy |
| 2007/0140465 A1 | 6/2007 | Erhart |
| 2007/0177614 A1* | 8/2007 | Siripunkaw et al. ...... 370/401 |
| 2007/0192486 A1* | 8/2007 | Wilson et al. ............ 709/225 |
| 2007/0192798 A1* | 8/2007 | Morgan ............ 725/51 |
| 2007/0217436 A1 | 9/2007 | Markley |
| 2007/0250863 A1* | 10/2007 | Ferguson ............ 725/46 |
| 2008/0168523 A1* | 7/2008 | Ansari et al. ............ 725/131 |
| 2008/0198858 A1* | 8/2008 | Townsley et al. ............ 370/401 |
| 2008/0271069 A1 | 10/2008 | Kim |
| 2008/0313230 A1* | 12/2008 | Karaoguz et al. ............ 707/104.1 |
| 2008/0313691 A1 | 12/2008 | Cholas |
| 2009/0019486 A1 | 1/2009 | Kalaboukis |
| 2009/0019497 A1 | 1/2009 | White |
| 2009/0031400 A1* | 1/2009 | Anderson ............ 726/4 |
| 2009/0070408 A1 | 3/2009 | White |
| 2009/0070845 A1 | 3/2009 | White |
| 2009/0089353 A1* | 4/2009 | Fukuta et al. ............ 709/201 |
| 2009/0089824 A1* | 4/2009 | Beyabani ............ 725/17 |
| 2009/0138928 A1* | 5/2009 | Karaoguz et al. ............ 725/110 |
| 2009/0187939 A1* | 7/2009 | Lajoie ............ 725/34 |
| 2009/0235351 A1 | 9/2009 | Brown |
| 2009/0282098 A1* | 11/2009 | Karaoguz et al. ............ 709/203 |
| 2009/0300673 A1* | 12/2009 | Bachet et al. ............ 725/31 |
| 2012/0278468 A1* | 11/2012 | Karaoguz et al. ............ 709/223 |

OTHER PUBLICATIONS

Wikipedia, "Signaling System 7", pp. 1-7, http://en.wikipedia.org/wiki/Signaling_System_7; website last visited May 5, 2009.

* cited by examiner

100

METHOD AND APPARATUS FOR TRANSPORTING MEDIA CONTENT IN A VIRTUAL PRIVATE NETWORK HAVING CONFIGURABLE NETWORK DEVICES

CROSS-REFERENCE TO RELATED APPLICATIONS

This application is a continuation of and claims priority to U.S. patent application Ser. No. 12/436,075 filed May 5, 2009, the disclosure of which is incorporated herein by reference in its entirety.

FIELD OF THE DISCLOSURE

The present disclosure relates generally to the transporting of content and more specifically to a method and apparatus for transporting content.

BACKGROUND

Service providers often provide transport connections to various media devices requesting media content and deliver the requested media content to the media devices via the established transport connections. Such is the case in present interactive television networks, which transmit signaling information and media content together from a media source to a media consumption device.

DETAILED DESCRIPTION

Figure 1:
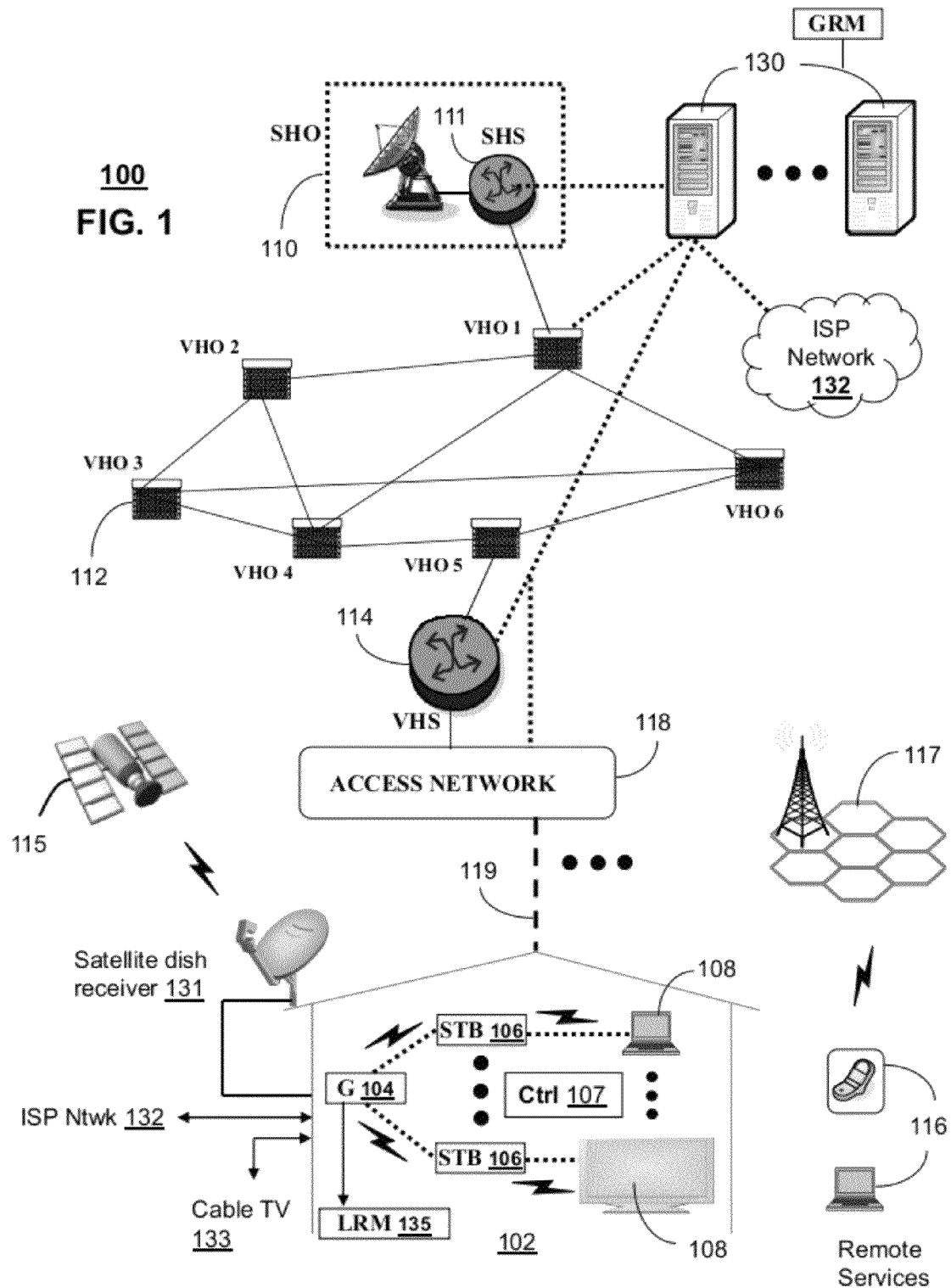
FIGS. 1-2 depict illustrative embodiments of communication systems that provide media services.

One embodiment of the present disclosure can entail a global resource manager (GRM) in an interactive (iTV) network, having a controller to receive signaling information from a local resource manager (LRM) located remotely from the GRM, wherein the signaling information identifies a recipient media processor (RMP) and contains information describing at least one media characteristic of media content selected by an initiating media processor (IMP), determine a location of the RMP and a media capability of the RMP, compare the media capability of the RMP to the at least one media characteristic of the media content, determine a media configuration of at least one network element in the iTV network based on the comparison, establish a virtual private network (VPN) connection to support communications between the IMP and the RMP, configure at least one network element of the VPN based on the media configuration, and transmit signaling information associated with the configured VPN to the LRM to enable the IMP to present the media content at the RMP over the VPN.

Another embodiment of the present disclosure can entail an IMP operating in a private premises, having a controller to select media content and a RMP to present the media content, transmit signaling information to a LRM in proximity to the premises via a gateway, wherein the signaling information identifies the RMP and contains information describing a plurality of media characteristics of the selected media content, wherein the LRM informs a GRM operating in an iTV network and located remotely from the premises of a need to present at the RMP the selected media content having at least a portion of the plurality of media characteristics, wherein the GRM identifies a location of the recipient media processor and a media capability of the RMP, wherein the GRM compares the media capability of the RMP to the plurality of media characteristics of the selected media content, wherein the GRM identifies a media configuration of one or more network elements of the iTV network according to the foregoing comparison to enable presentation of the selected media content at the RMP, wherein the GRM establishes a VPN connection in the iTV network for supporting media communications between the IMP and the RMP, wherein the GRM configures one or more network elements of the VPN according to the media configuration, and wherein the GRM transmits signaling information to the LRM associated with the configured VPN, receive from the LRM signaling information to enable the IMP to present at the RMP the selected media content over the configured VPN, and present the selected media content at the RMP via the configured VPN.

Yet another embodiment of the present disclosure can entail a LRM, having a controller to receive signaling information from an IMP operating in a premises and located in proximity to the LRM, wherein the signaling information identifies a RMP and contains information describing at least one media characteristic of media content selected by the IMP, and communicate the signaling information to a GRM located remotely from the premises and operating in an iTV network, wherein the GRM is operable to determine from the signaling information a location of the RMP and a media capability of the RMP, compare the media capability of the RMP to the at least one media characteristic of the media content, determine a media configuration of at least one network element in the iTV network based on the comparison, establish a VPN connection between the IMP and the RMP, configure at least one network element of the VPN according to the media configuration, and transmit signaling information to the LRM describing the VPN configuration, and wherein the controller of the LRM is configured to receive from the GRM the signaling information, and enable the IMP to present at the RMP the media content over the configured VPN according to the signaling information received from the GRM.

Yet another embodiment of the present disclosure can entail a method including selecting media content and a RMP to present the selected media content, and transmitting signaling information to a GRM operating in an iTV network, wherein the signaling information identifies the RMP and contains information describing at least one media characteristic of the selected media content, wherein the GRM is operable to identify a location of the RMP and a media capability of the RMP from the signaling information, compare the media capability of the RMP to the at least one media characteristic of the selected media content, determine a media configuration of at least one network element of the iTV network based on the comparison, establish a VPN connection between the IMP and the RMP for presenting the media content, configure at least one network element of the VPN based on the media configuration, and enable the IMP to present the selected media content at the RMP over the configured VPN.

Yet another embodiment of the present disclosure can entail a computer-readable storage medium, having computer instructions to receive signaling information from an IMP, wherein the signaling information identifies a RMP and contains information describing at least one media characteristic of media content selected by the IMP to be presented at the RMP, and transmit the signaling information to a GRM located remotely from the IMP, wherein a location of the RMP and a media capability of the RMP are determined by the GRM, wherein the media capability of the RMP is compared to the at least one media characteristic of the media content by the GRM, wherein a media configuration of at least one network element in an iTV network containing the GRM is determined by the GRM based on the comparison, wherein a secure transport connection is established by the GRM and at least one network element of the secure transport connection is configured by the GRM based on the media configuration, and wherein the media content is presented at the RMP over the configured secure transport connection.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a LRM 135. Notably, the LRM 135 can be a gateway, a server, a router, or other computing device. The LRM 135 can be located in proximity to the commercial and/or residential buildings 102 and the devices located therein. Additionally, the LRM 135 can be configured to receive signaling information from any of the devices in the communication system 100, however, the LRM 135 can also be specifically configured/tailored to receive signaling information from the devices located in proximity to the LRM 135 as well. For example, the LRM 135 can receive signaling information from the gateway 104, the STBs 106, and/or media device 108 and can be tailored to such devices. The signaling information can indicate a RMP, selected by devices in the communication system 100, to present and/or receive media content, media characteristics of the media content selected by the devices for presentation at the RMP, and/or any other signaling information.

Another distinct portion of the computing devices 130 can function as a GRM (herein referred to as GRM 130), which can reside in an iTV network and can be remote and/or independent from the LRM 135 and devices in proximity to the LRM 135. The GRM 130 can be a gateway, a router, or other computing device capable of performing the functions detailed below. The GRM 130 can use common computing and communication technology to perform the function of receiving signaling information from other devices in the first communication system 100, such as the LRM 135. The GRM 130 can determine a location of a RMP and a media capability of the RMP and can compare the media capability of the RMP to media characteristics of the media content selected for presentation at the RMP.

Additionally, the GRM 130 can determine a media configuration of one or more network elements in the iTV network based on the comparison. Furthermore, a secure connection, such as a VPN connection, can be established by the GRM 130 or other elements in the iTV network to enable presentation of the media content at the RMP and network elements of the secure connection can be tailored to the media configuration. The device selecting the media content to be presented at the RMP or a device capable of accessing the selected media content can stream and/or transfer the media content to the RMP over the secure connection.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
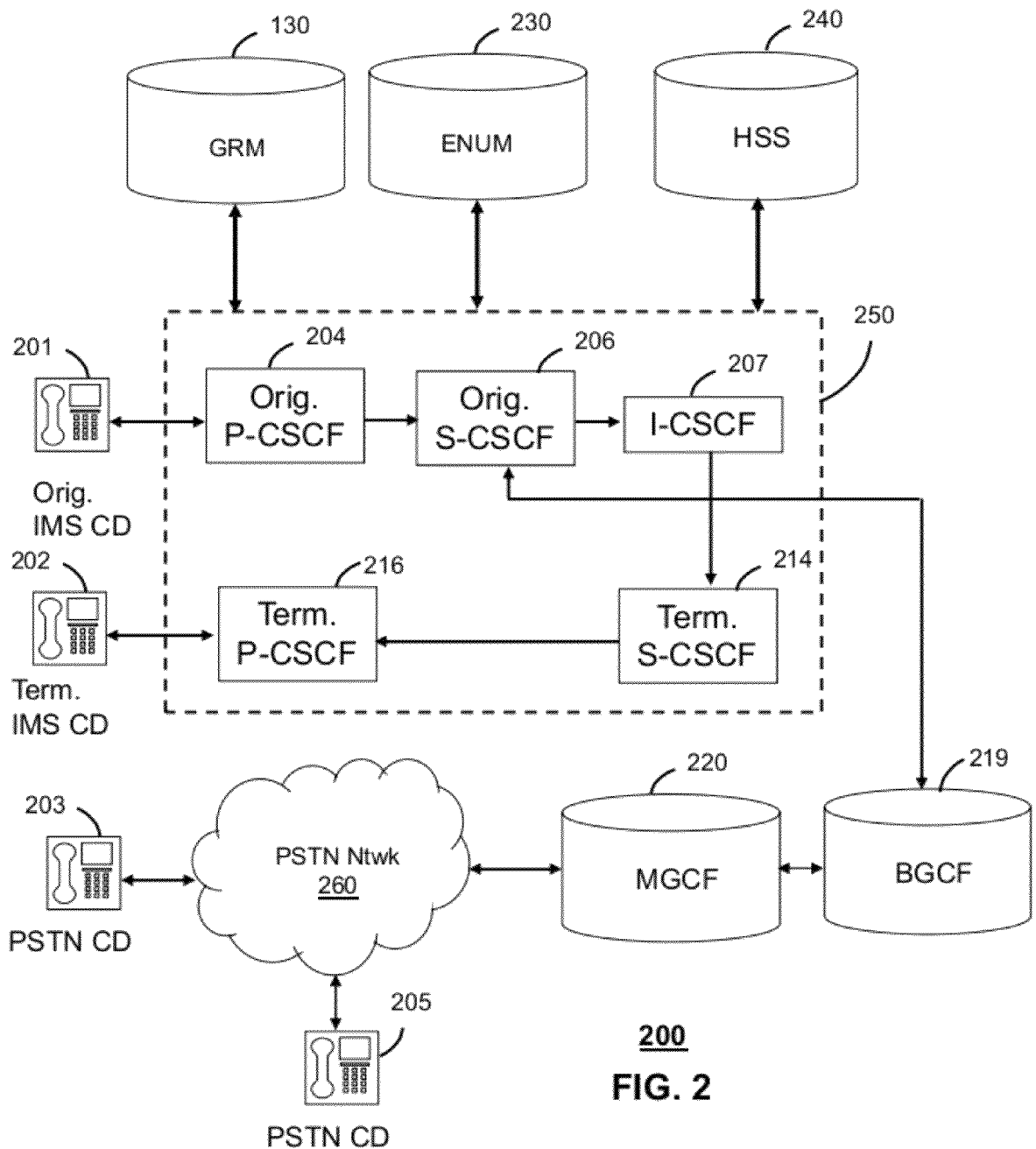

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The GRM 130 of FIG. 1 can be operably coupled to the second communication system 200 for purposes similar to those described above.

Figure 3:
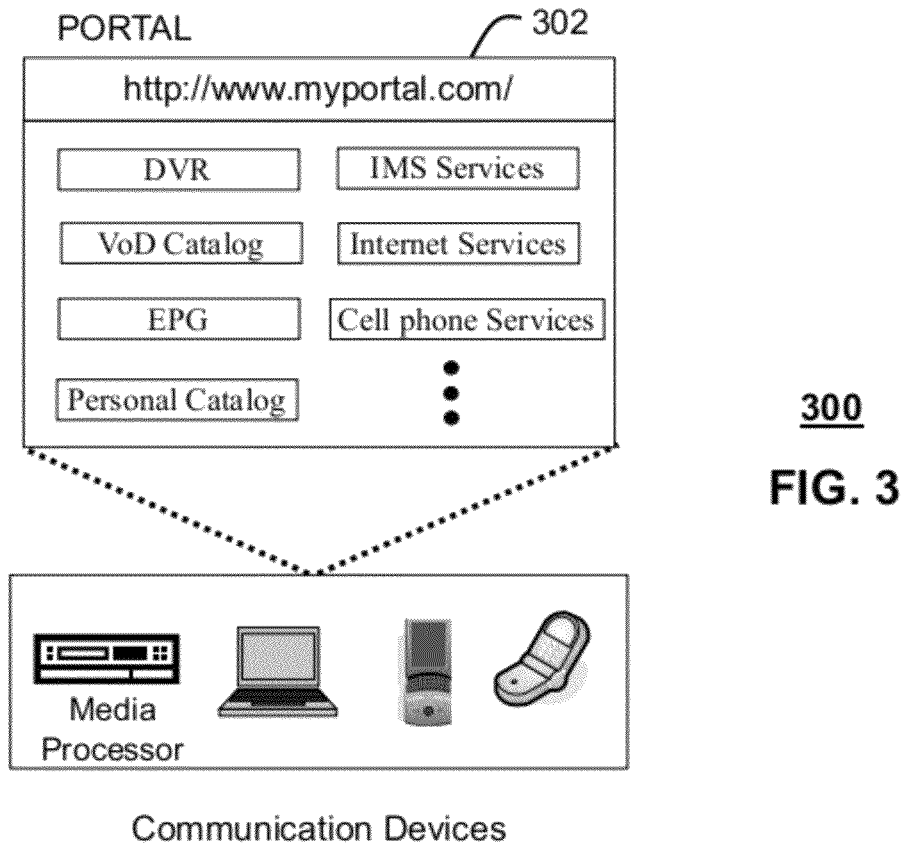
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
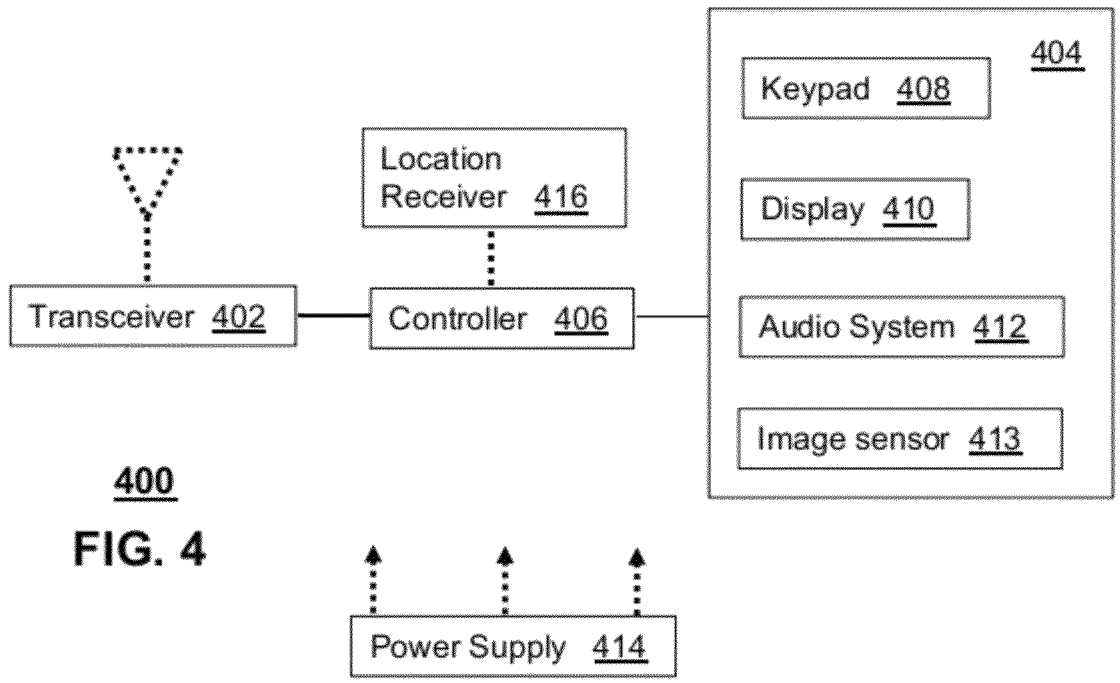
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
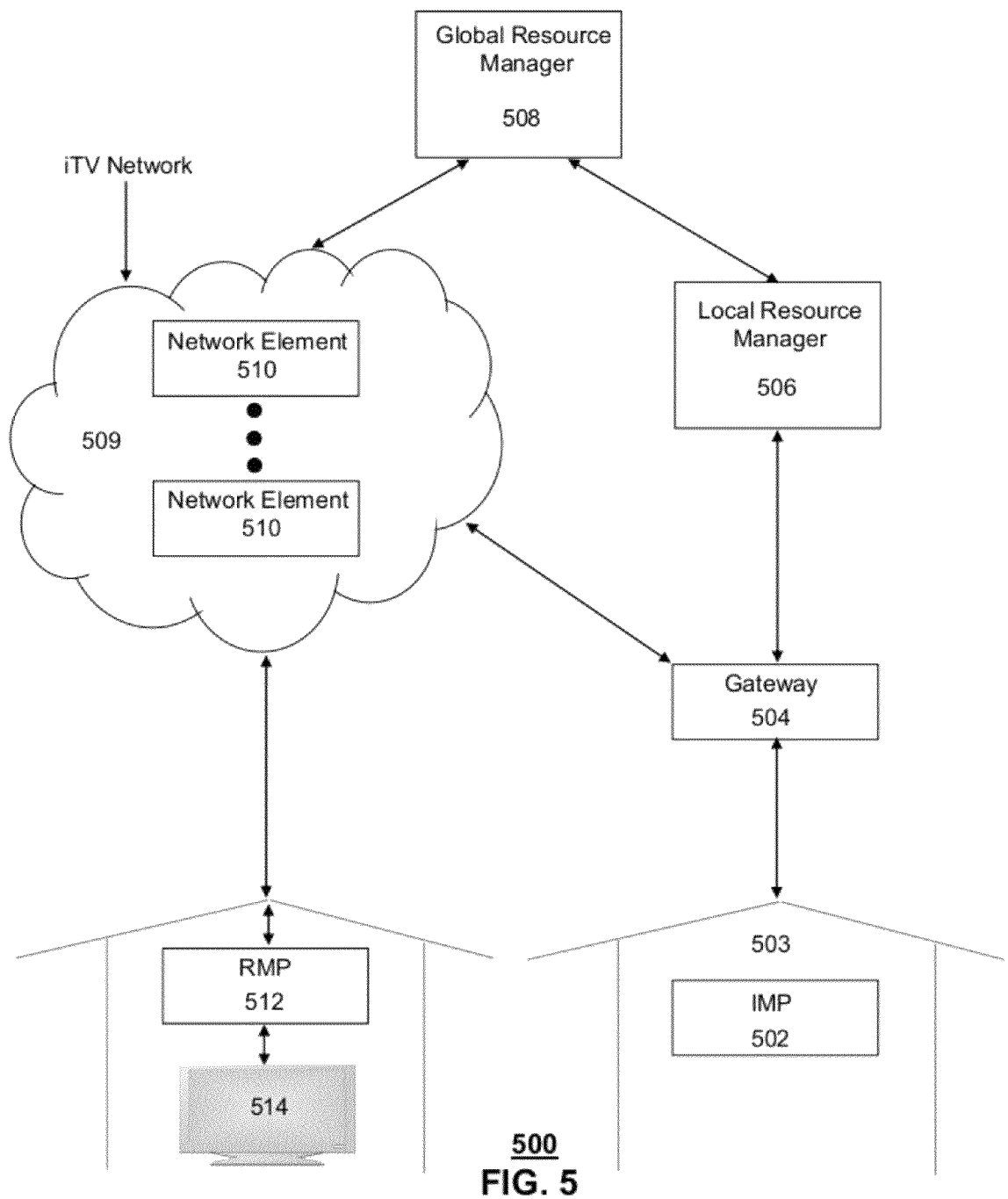
FIG. 5 depicts an illustrative embodiment of an system for transporting content, the system operating in portions of the communication systems of FIGS. 1-2.

FIG. 5 depicts an illustrative embodiment of a system 500 for transporting content, the system operable in portions of the communication systems of FIGS. 1-2. The system 500 can include an IMP 502, which can be a STB, a media player, a DVR, or other media processor. The IMP can reside within a private space/network 503, which can, for example, restrict access to any device outside the private space/network 503 trying to access devices inside the private space/network 503 and can utilize private IP addresses or other unique identifiers for distinguishing devices within the private space 503 from devices outside the private space 503.

The system 500 can also include a gateway 504 and a LRM 506, which can be in proximity to the private space 503 and tailored to the characteristics of the private space 503. The gateway 504 can be utilized by the IMP 502 to transmit signaling information to the LRM 506. Subsequently, the LRM 506 can then transmit the received signaling information to a GRM 508, which can be configured to receive the signaling information from multiple LRMs (not explicitly shown) and can be configured to operate in an iTV network 509. Notably, the iTV network 509 can include IPTV networks, satellite television networks, cable television networks, and other media content networks. The GRM 508 can add an identifier to the signaling information received from LRM 506 to differentiate the signaling information coming from LRM 506 from signaling information coming from other LRMs.

Additionally, the system 500 can include one or more network elements 510. The network elements 510 can be servers, routers, gateways, and/or communications devices such as those found in FIG. 1 and can connect to any of the devices in FIGS. 1-2 and 5. The system 500 can further include a RMP 512 and a display device 514 for displaying media content selected by the IMP 502.

Figure 6:
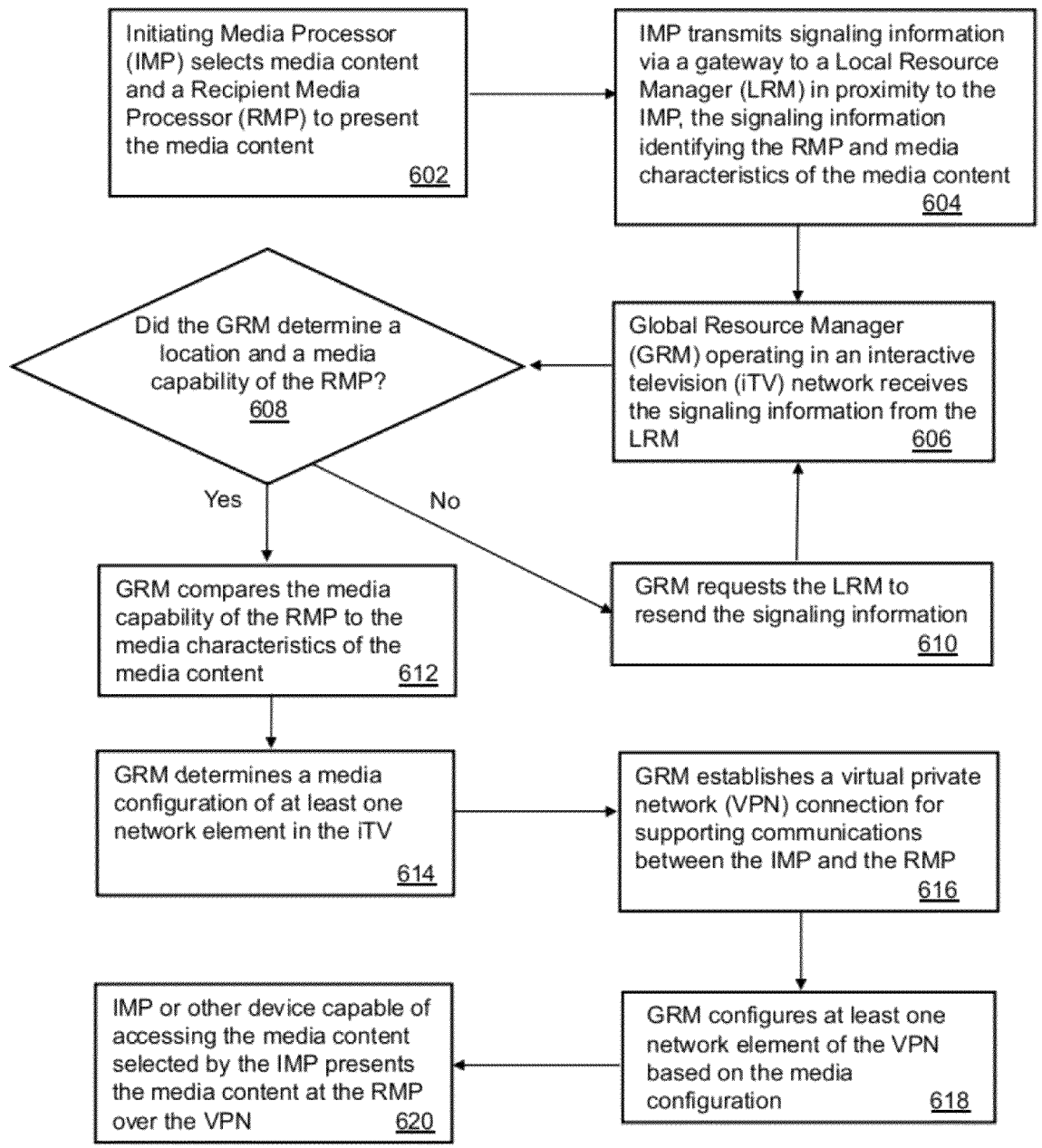
FIG. 6 depicts an illustrative embodiment of a method operating in portions of the communications systems of FIGS. 1-2 and the system of FIG. 5.

FIG. 6 depicts an illustrative method 600 that operates in portions of the communication system of FIGS. 1-2 and FIG. 5. Method 600 can begin with step 602 in which IMP 502 selects media content and a RMP, such as RMP 512, to present the selected media content. The media content can include audio, video, still image, voice, and/or text content. In an embodiment, the IMP 502 can add a first identifier to the signaling information prior to transmitting the signaling information to the LRM 506 to distinguish it from signaling information from another IMP. At step 604, the IMP 502 can transmit signaling information to the LRM 506 located in proximity to the IMP 502 via gateway 504. In an embodiment, the IMP 502 can transmit the signaling information directly to the LRM 506 or through a network element 510. The signaling information can be utilized to identify the RMP 512 and can identify one or more media characteristics of the selected media content.

The media characteristics of the media content can include an encoding format, a protocol, a resolution format, an aspect ratio format, media information, and/or other information. The encoding format, for example, can include audio, video, and other formats such as, but not limited to, MPEG-4, MPEG-1, H.261, H.263, DivX, WMV, x264, WAV, Audio Interchange File Format (AIFF), among other formats. Resolution formats can include, but are not limited to, SDTV, EDTV, and HDTV, which can support multiple resolutions such as 720p, 1080i, and 1080p. Media information can include information about the media content such as the duration of the content, title of the content, a description of the content and other information.

At step 606, the GRM 508, which can operate in iTV network 509 and can be remote and independent from the LRM 506 and IMP 502, can receive the signaling information from the LRM 506 and signaling information from other LRMs. As mentioned above, the iTV network 509 can include IPTV networks, cable television networks, satellite television networks, and other forms of media content networks. In an embodiment, LRM 506 can add a second identifier to the signaling information it transmits to the GRM 508 to distinguish it from signaling information from another LRM. The GRM 508 can then determine a location of the RMP 512 and a media capability of the RMP 512 at step 608. If the GRM 508 can not determine the location and/or the media capability of the RMP 512, the GRM 508 can send a request to the LRM 506 to resend the signaling information at step 610. On the other hand, if the GRM 508 can determine the location and/or the media capability of the RMP 512, the GRM 508 can compare the media capability of the RMP 512 to the media characteristics of the media content at step 612. For example, the GRM 508 might determine that the media content is in MPEG-4 format and the media capability of the RMP 512, based on the comparison, supports the format.

At step 614, the GRM 508 can determine a media configuration of one or more network elements 510 in the iTV network 509. Once the media configuration is determined, the GRM 508 can establish a secure connection, such as a VPN connection, for supporting communications between the IMP 502, RMP 512, network elements 510, and any other necessary devices at step 616. At step 618, the GRM 508 can configure the network elements 510 of the secure connection/VPN based on the media configuration. The network elements 510 of the secure connection/VPN can, for example, include encoders and routers.

The GRM 508 can then transmit signaling information to the LRM 506 associated with the configured VPN and, in response, can receive from the LRM 506 signaling information to enable the IMP 502 to present at the RMP 512 the selected media content over the configured secure connection/VPN. In an embodiment, the GRM 508 can add a third identifier to the signaling information it transmits to the LRM 506 to identify which IMP 502 the signaling information is intended for. Of course, the IMP 502 does not have to be the device that has to present the media content over the secure connection/VPN, but, instead, any device capable of accessing the content selected by the IMP 502 can present the media content at the RMP 512. Presenting the content can involve streaming the content to the RMP 512 and/or possibly transferring the content. The actual media content itself can be displayed via display device 514.

In an example illustration of a system in which the method 600 can be implemented can be seen in the context of a private surveillance system. If an IMP in the surveillance system wants to send surveillance video to another device either inside or outside the private system, the IMP can broker up signaling identifying the RMP and describing media characteristics of the surveillance video to a gateway, which can then transmit the signaling information to a LRM. The LRM can transmit the signaling information to a GRM, which can determine the media capabilities of the RMP and the location of the RMP. For example, the video might be in MPEG-4 format and the RMP can be located outside the private space of the surveillance system.

The GRM, which can be located in an IPTV network and can be independent from the LRM and IMP, can then compare the capabilities of the RMP to the media characteristics of the video and can then determine a media configuration of network elements in the IPTV network. The IPTV network can be utilized to control the signaling aspects of the media content separately from the actual presentation and/or delivery of the media content. Additionally, a VPN connection can be established to enable communication/presentation of the video to the RMP and the network elements of the VPN can be tailored based on the media configuration. The surveillance video can then be presented at the RMP by the IMP or another device capable of accessing the video selected by the IMP.

Upon reviewing the aforementioned embodiments, it would be evident to an artisan with ordinary skill in the art that said embodiments can be modified, reduced, or enhanced without departing from the scope and spirit of the claims described below. For example, in an embodiment, the method 600 can include enabling the GRM 508 and/or other devices in the systems of FIGS. 1-2, and 5 to present substitute media content at the RMP 512 up until the presentation of the actual media content itself is initiated at the RMP 512. For example, if the secure connection to the RMP 512 has been set up and the RMP 512 is waiting for the media content, the GRM 508 can send white space video to the RMP 512 until the presentation of the actual media content begins. Once the presentation of the actual media content begins, the white space video can be discarded by the RMP 512. Similarly, for other devices in the above systems requiring and/or expecting media content along with the signaling information describing the content, substitute media content can be sent to the devices to appease the devices. For example, if a network element 510 in the iTV network expects media content to arrive with signaling information describing the media content, the GRM 508 can send/present white space video or other substitute media content at the network element 510. The substitute content can operates as a placebo for the selected media content prior to enablement of the IMP to present the selected media content at the RMP over the configured VPN.

Other suitable modifications can be applied to the present disclosure without departing from the scope of the claims below. Accordingly, the reader is directed to the claims section for a fuller understanding of the breadth and scope of the present disclosure.

Figure 7:
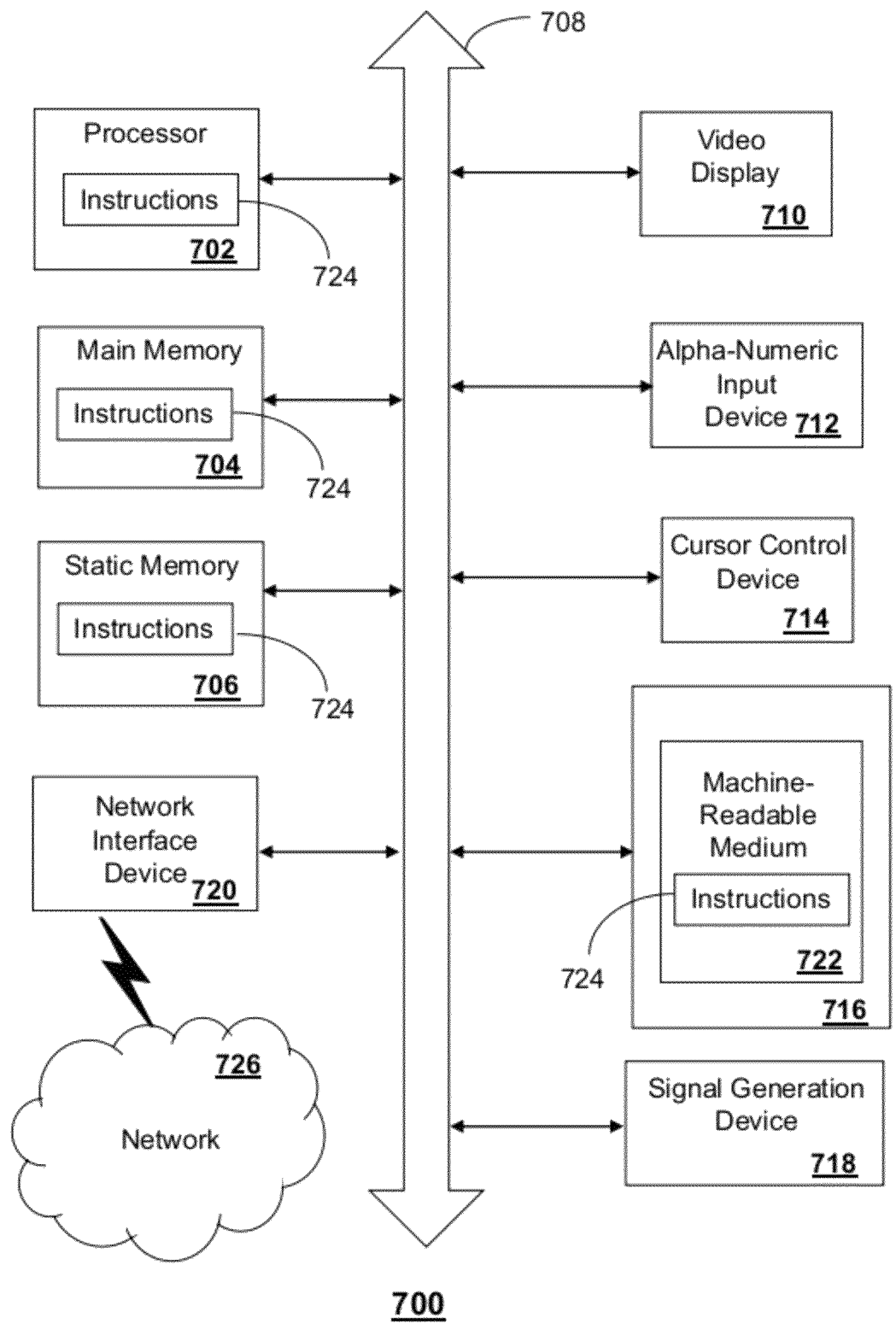
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 614 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine readable storage medium comprising instructions which, responsive to being executed by a processor within a global resource manager server, cause the processor to perform operations comprising:
    receiving first signaling information from a local resource manager server located remotely from the global resource manager server, wherein the first signaling information identifies a recipient media processor and describes a media characteristic of media content;
    determining a location of the recipient media processor and a media capability of the recipient media processor based on the first signaling information;
    comparing the media capability of the recipient media processor to the media characteristic of the media content;
    determining a media configuration of a network element in an interactive television network based on the comparing of the media capability of the recipient media processor to the media characteristic of the media content;
    facilitating establishment of a virtual private network to support communications between an initiating media processor and the recipient media processor based on the first signaling information received from the local resource manager server;
    configuring a network element of the virtual private network, resulting in a configured virtual private network, based on the media configuration; and
    transmitting second signaling information associated with the configured virtual private network to the local resource manager server to cause the initiating media processor to present the media content at the recipient media processor over the configured virtual private network.

2. The non-transitory machine readable storage medium of claim 1, wherein the media content is selected by the initiating media processor.

3. The non-transitory machine readable storage medium of claim 1, wherein the first signaling information includes a first identifier added by the local resource manager to distinguish from third signaling information from another local resource manager server, and further comprising instructions which, responsive to being executed by the processor, cause the processor to perform operations comprising:
    adding a second identifier to the second signaling information to identify the initiating media processor that is to be provided with the second signaling information.

4. The non-transitory machine readable storage medium of claim 1, comprising instructions which, responsive to being executed by the processor, cause the processor to perform operations comprising providing substitute media content for the recipient media processor until a presentation of the media content is initiated at the recipient media processor.

5. The non-transitory machine readable storage medium of claim 4, wherein each of the global resource manager server and the local resource manager server comprise one of a gateway or a router.

6. The non-transitory machine readable storage medium of claim 1, wherein the interactive television network comprises one of an Internet Protocol television network, an interactive cable television network, an interactive satellite television network, or a combination thereof.

7. The non-transitory machine readable storage medium of claim 1, wherein the media content comprises one of video content, image content, audio content, text content, or a combination thereof.

8. The non-transitory machine readable storage medium of claim 1, wherein the media characteristic of the media content comprises a plurality of characteristics including an encoding format, a protocol, a resolution format, and an aspect ratio format.

9. The non-transitory machine readable storage medium of claim 1, wherein the network element of the configured virtual private network comprises an encoder.

10. The non-transitory machine readable storage medium of claim 1, wherein the initiating media processor and the recipient media processor each comprise one of a set-top box, a media player or a digital video recorder.

11. The non-transitory machine readable storage medium of claim 1, wherein a presentation of the media content is generated based on streaming the media content to the recipient media processor.

12. The non-transitory machine readable storage medium of claim 1, wherein the media content is surveillance video.

13. A system comprising:
    a global resource manager server, and
    a local resource manager server in communication with the global resource manager server, wherein the local resource manager server is located remotely from the global resource manager server and provides first signaling information to the global resource manager server, wherein the first signaling information identifies a recipient media processor and describes a media characteristic of media content,
    wherein the global resource manager server determines a location of the recipient media processor and a media capability of the recipient media processor based on the first signaling information,
    wherein the global resource manager server determines a comparison between the media capability of the recipient media processor and the media characteristic of the media content,
    wherein the global resource manager server determines a first media configuration of a first network element in an interactive television network based on the comparison between the media capability of the recipient media processor and the media characteristic of the media content,
    wherein the first media configuration is configured to cause configuration of a second network element of a virtual private network, resulting in a configured virtual private network, based on the first media configuration, wherein the configured virtual private network supports communications between an initiating media processor and the recipient media processor, and
    wherein the global resource manager server provides second signaling information associated with the configured virtual private network to the local resource manager server to cause the initiating media processor to present the media content at the recipient media processor over the configured virtual private network.

14. The system of claim 13, wherein the media content is surveillance video.

15. The system of claim 13, wherein the media characteristic of the media content comprises a plurality of characteristics including an encoding format, a protocol, a resolution format, and an aspect ratio format, and wherein the second network element of the configured virtual private network comprises an encoder.

16. The system of claim 13, wherein the initiating media processor and the recipient media processor each comprise a set-top box, and wherein each of the global resource manager server and the local resource manager server comprise a router.

17. A non-transitory machine readable storage medium comprising instructions which, responsive to being executed by a processor within a local resource manager server, cause the processor to perform operations comprising:
    receiving a request to distribute media content to a recipient media processor, wherein the request is received from an initiating media processor, and
    providing first signaling information to a global resource manager server located remotely from the local resource manager server, wherein the first signaling information identifies a recipient media processor and describes a media characteristic of media content,
    wherein the first signaling information is configured to cause the global resource manager server to determine a location of the recipient media processor and a media capability of the recipient media processor,
    wherein the first signaling information is configured to cause the global resource manager to determine a comparison between the media capability of the recipient media processor and the media characteristic of the media content,
    wherein the first signaling information is configured to cause the global resource manager to determine a first media configuration of a first network element in an interactive television network based on the first signaling information and the comparison between the media capability of the recipient media processor and the media characteristic of the media content,
    wherein the first media configuration is configured to cause configuration of a second network element of a virtual private network, resulting in a configured virtual private network, based on the first media configuration, wherein the configured virtual private network supports communications between the initiating media processor and the recipient media processor, and
    wherein the first signaling information is configured to cause the global resource manager server to provide second signaling information associated with the configured virtual private network to the local resource manager server to cause the initiating media processor to present the media content at the recipient media processor over the configured virtual private network.

18. The non-transitory machine readable storage medium of claim 17, wherein the media characteristic of the media content comprises a plurality of characteristics including an encoding format, a protocol, a resolution format, and an aspect ratio format, and wherein the network element of the configured virtual private network comprises an encoder.

19. The non-transitory machine readable storage medium of claim 17, wherein the initiating media processor and the recipient media processor correspond to a set-top box, and wherein each of the global resource manager server and the local resource manager server include a router.

* * * * *